United States Patent
Chen et al.

(10) Patent No.: US 8,249,369 B2
(45) Date of Patent: Aug. 21, 2012

(54) METHOD AND APPARATUS OF TILE-BASED BELIEF PROPAGATION

(75) Inventors: Liang-Gee Chen, Taipei (TW); Chao-Chung Cheng, Taipei (TW); Chia-Kai Liang, Taipei (TW); Yen-Chieh Lai, Taipei (TW); Homer H. Chen, Taipei (TW); Ling-Hsiu Huang, Tainan (TW)

(73) Assignees: Himax Technologies Limited, Tainan County (TW); National Taiwan University, Taipei (TW)

( * ) Notice: Subject to any disclaimer, the term of this patent is extended or adjusted under 35 U.S.C. 154(b) by 868 days.

(21) Appl. No.: 12/367,032

(22) Filed: Feb. 6, 2009

(65) Prior Publication Data

US 2010/0135585 A1  Jun. 3, 2010

Related U.S. Application Data

(60) Provisional application No. 61/119,333, filed on Dec. 2, 2008.

(51) Int. Cl.
*G06K 9/36* (2006.01)
(52) U.S. Cl. ......... 382/232; 382/227; 382/275; 382/284
(58) Field of Classification Search .................. 382/154, 382/227, 275, 284; 345/419, 582, 634, 637, 345/639
See application file for complete search history.

(56) References Cited

U.S. PATENT DOCUMENTS

| 7,502,521 | B2 * | 3/2009 | Sun et al. | 382/254 |
| 7,599,547 | B2 * | 10/2009 | Sun et al. | 382/154 |
| 2009/0164192 | A1 * | 6/2009 | Yu | 703/13 |
| 2011/0285701 | A1 * | 11/2011 | Chen et al. | 345/419 |

OTHER PUBLICATIONS

"A Comparative Study of Energy Minimization Methods for Markov Random Fields with Smoothness-Based Priors"IEEE Transactions on Pattern Analysis and Machine Intelligence, vol. 30, No. 6, Jun. 2008, pp. 1068-1080.*
He et al., "Parallel Processing for Fast Iterative Decoding of Orthogonal Convolutional Codes",IEEE Communications Letters, vol. 10, No. 9, Sep. 2006, pp. 664-666.*
Felzenszwalb et al., "Efficient Belief Propagation for Early Vision", International Journal of Computer Vision 70(1), pp. 41-54,published 2006.*
Richard Szeliski,"A Comparative Study of Energy Minimization Methods for Markov Random Fields with Smoothness-Based Priors"IEEE Transactions on Pattern Analysis and Machine Intelligence, vol. 30, No. 6, Jun. 2008, pp. 1068-1080.*
Yu-Cheng Tseng, "Low Memory Cost Block-Based Belief Propagation for Stereo Correspondence",IEEE, 2007, pp. 1415-1418.*

* cited by examiner

*Primary Examiner* — Matthew Bella
*Assistant Examiner* — Mekonen Bekele
(74) *Attorney, Agent, or Firm* — Stout, Uxa, Buyan & Mullins, LLP

(57) ABSTRACT

A method and apparatus of tile-based belief propagation are disclosed. An image is split into a number of tiles. Messages are iteratively generated within each of the tiles based on the messages from neighboring pixels to the tile at a previous iteration, wherein each message represents information of a state of the pixel. The generated messages for sending out of the tiles are stored. Labels are then determined based on the stored messages, wherein each label represents the state of the pixel.

21 Claims, 8 Drawing Sheets

Level l+1  Level l

METHOD AND APPARATUS OF TILE-BASED BELIEF PROPAGATION

CROSS-REFERENCE TO OTHER APPLICATIONS

The present application claims the benefit of U.S. Provisional Application No. 61/119,333 filed on Dec. 2, 2008, the complete subject matter of which is incorporated herein by reference in its entirety.

BACKGROUND OF THE INVENTION

1. Field of the Invention

The present invention generally relates to image processing, and more particularly to tile-based belief propagation.

2. Description of the Prior Art

Energy (or cost) minimization on a Markov Random Field (MRF) is commonly applied to assign an optimal label to each node (pixel or block of pixels) of a scene representation in computer vision or image processing. A label stands for a local quantity of the state (or status) of the node. For example, the label may stand for the depth value of the node, or may stand for either foreground or background. There are two energy terms in the energy minimization: a data term $E_d$ and a smoothness term $E_s$. The data term $E_d$ penalizes the inconsistency between the labels and the observed data. In other words, for example, the data term $E_d$ should be increased when the labels and the observed data are inconsistent and vice versa. The smoothness term $E_s$ favors the spatial coherence of the labels. In other words, for example, the smoothness term $E_s$ should be decreased when the neighboring labels are consistent and vice versa. The optimal labels $\{l_p\}$ are the labels that minimize the combination of these two energy terms, $$\{l_p\} = \mathrm{argmin}\left\{\sum_{p \in P} E_d(l_p) + \sum_{(p,q) \in G} E_s(l_p, l_p)\right\} \quad (1)$$

where P is the set of all nodes and G is a specified neighborhood, such as the 4-nearest neighboring pixels.

Many algorithms have been proposed for finding the optimal label assignment as formulated in the energy minimization. Among the algorithms, belief propagation (BP) has become a popular technique for solving computer vision problems, such as stereo estimation and image denoising. The belief propagation has high potential for hardware implementation due to its high degree of parallelism and regularity of memory access. However, the belief propagation requires large amounts of memory and bandwidth, therefore forbidding straightforward hardware implementation.

As the original belief propagation could not be effectively implemented in hardware, a need has arisen to propose a modified belief propagation which has similar performance but with much lower bandwidth and memory requirements than the original BP algorithm.

SUMMARY OF THE INVENTION

In view of the foregoing, it is an object of the present invention to provide a tile-based belief propagation, which is more suitable for hardware implementation than the original belief propagation due to the substantially reduced memory and bandwidth consumption.

According to one embodiment of the present invention, an image is first split into a number of tiles. Messages are then iteratively generated by a message computing device (such as a parallel processor) within each of the tiles, based on the messages from neighboring pixels to the tile at a previous iteration, wherein each message represents information of a state of the pixel. The generated messages for sending out of the tiles are stored, for example, in a memory. Labels are finally determined in a belief decision device based on the stored messages, wherein each label represents the state of the pixel.

DETAILED DESCRIPTION OF THE INVENTION

Figure 1:
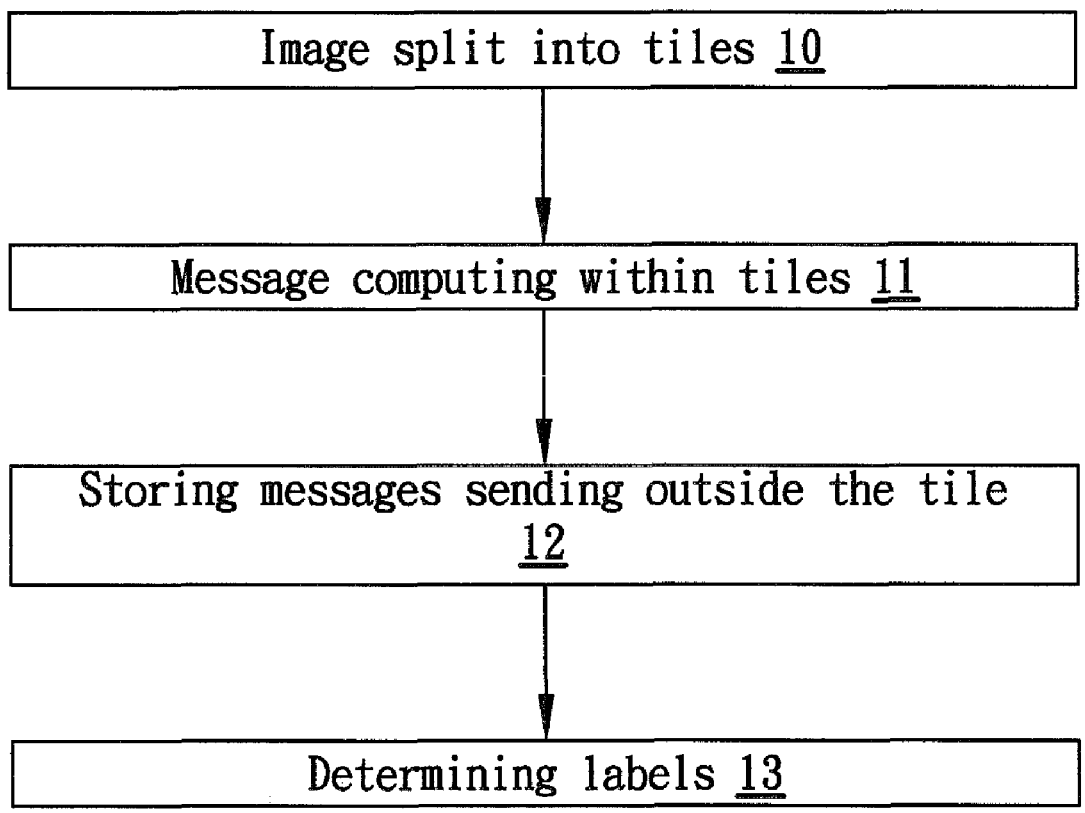
FIG. 1 shows a flow diagram of a tile-based belief propagation (BP) according to one embodiment of the present invention.

FIG. 1 shows a flow diagram of a tile-based belief propagation (BP) according to one embodiment of the present invention. The present invention may be applied in a variety of applications in image processing, such as, but not limited to, image denoising, stereo matching, motion estimation and depth generation. An exemplary pseudocode of the tile-based belief propagation is shown below.

--- pseudocode

Function $\{l_p\} \leftarrow$ TileBasedBP($E_d$, $E_s$, B, $T_0$, $T_i$)
1    Initialize all message entities $M_{pq}^0(l)=0$
2    for $t_0=1,\ldots,T_0$
3       loop through all tiles in a raster scan order
4          Load $\{M_{pq}^{t-1}\}$ for $p \notin C$ and $q \in C$; //C is the current tile.
5          Load $E_d(l_p)$ for $p \in C$;
6          for $t_i=1,\ldots,T_i$
7             $\{M_{pq}^t\} \leftarrow$ BPinOneTile($\{M_{pq}^{t-1}\}$, $E_d$, C);
8          Store $\{M_{pq}^t\}$ for $p \in C$ and $q \notin C$;
9       loop through all tiles in an inverse-raster scan order
10         Load $\{M_{pq}^{t-1}\}$ for $p \notin C$ and $q \in C$;
11         Load $E_d(l_p)$ for $p \in C$;
12         for $t_i=1,\ldots,T_i$ -continued

```
pseudocode

13          {M_pq^t} ← BPinOneTile({M_pq^{t-1}}, E_d, C);
14          if (t_0=T_0) Obtain {l_p} for p ∈ C; //using Eq. (3);
15          else Store {M_pq^t} for p ∈ C and q ∉ C;
16     return {l_p};
Function {M_pq^t} ← BPinOneTile({M_pq^{t-1}}, E_d, C)
17     Initialize M_pq^t(l)=0 for all p ∈ C and q ∈ C;
18     Update rightward message; //using Eq. (2);
19     Update leftward message;
20     Update downward message;
21     Update upward message;
22     return {M_pq^t};
```

Figure 2A:
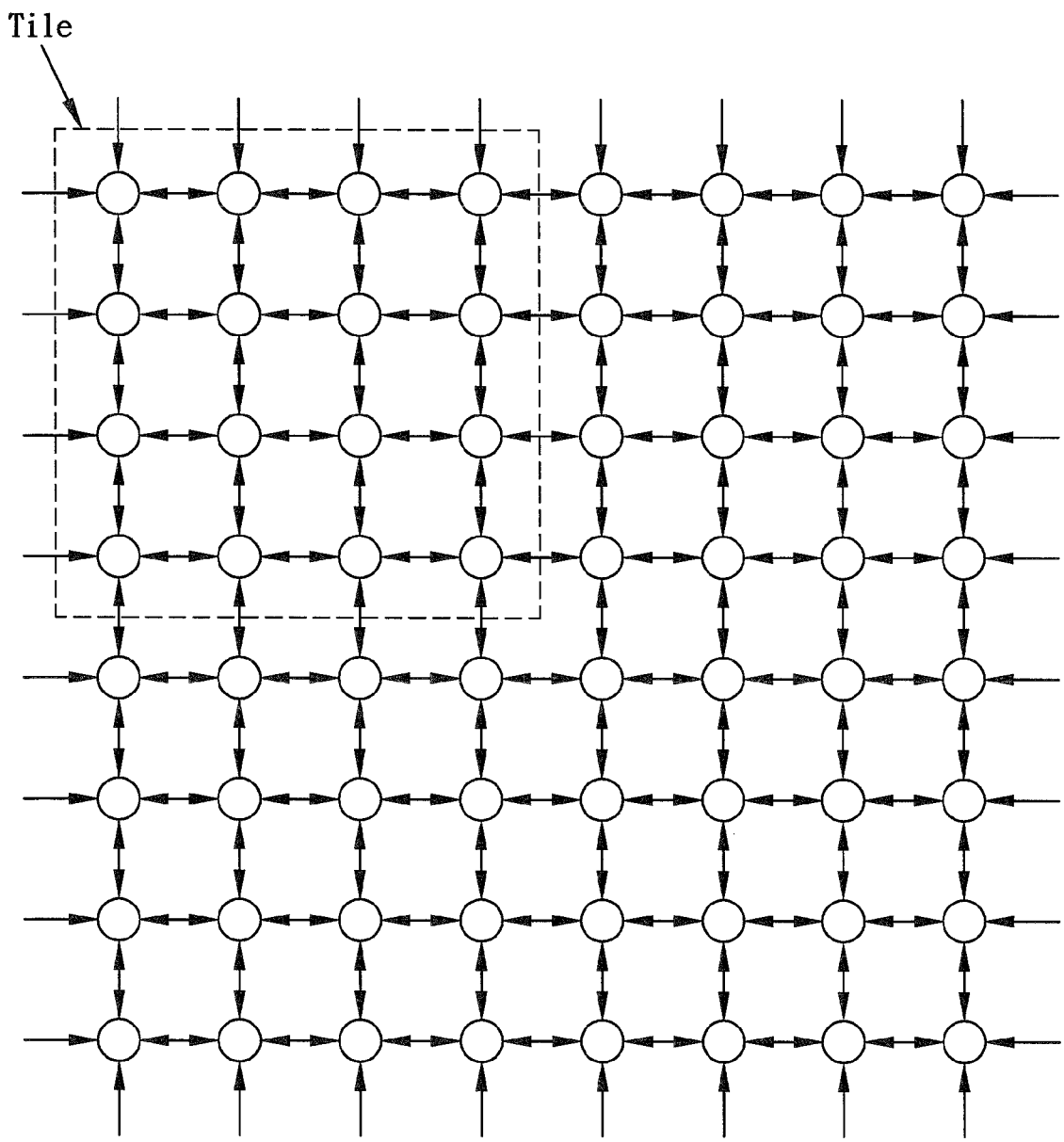
FIG. 2A shows a portion of an image, in which each tile is made of B×B pixels.
Figure 2B:
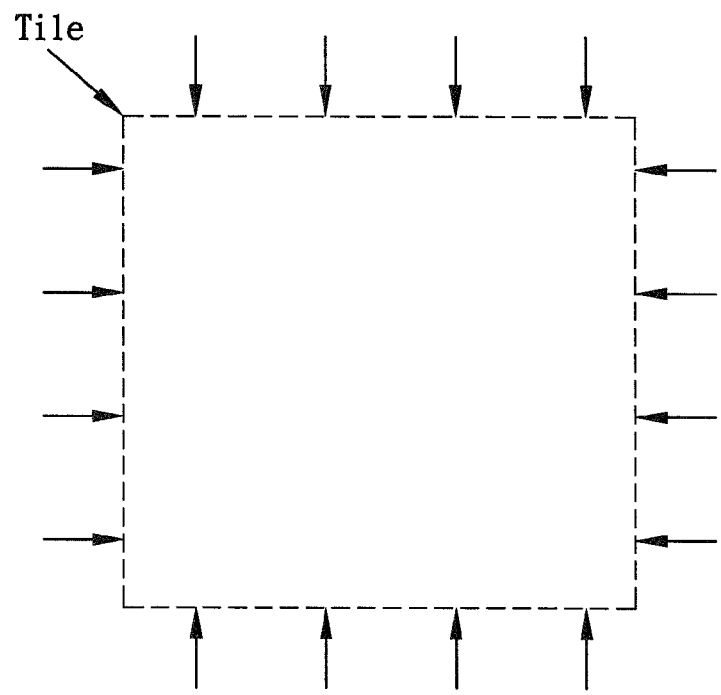
FIG. 2B schematically shows messages around the tile.

According to the embodiment, in step 10, the whole image is split into non-overlapping tiles of pixels. FIG. 2A shows a portion of an image, in which each tile is made of 4×4 pixels, while tile sizes other than 4×4 may be adapted as well. FIG. 2B schematically shows messages (i.e., the arrows) around the tile. The messages stand for information on the state (or status) of the outside world (that is, the pixels outside of the tile).

Figure 3A:
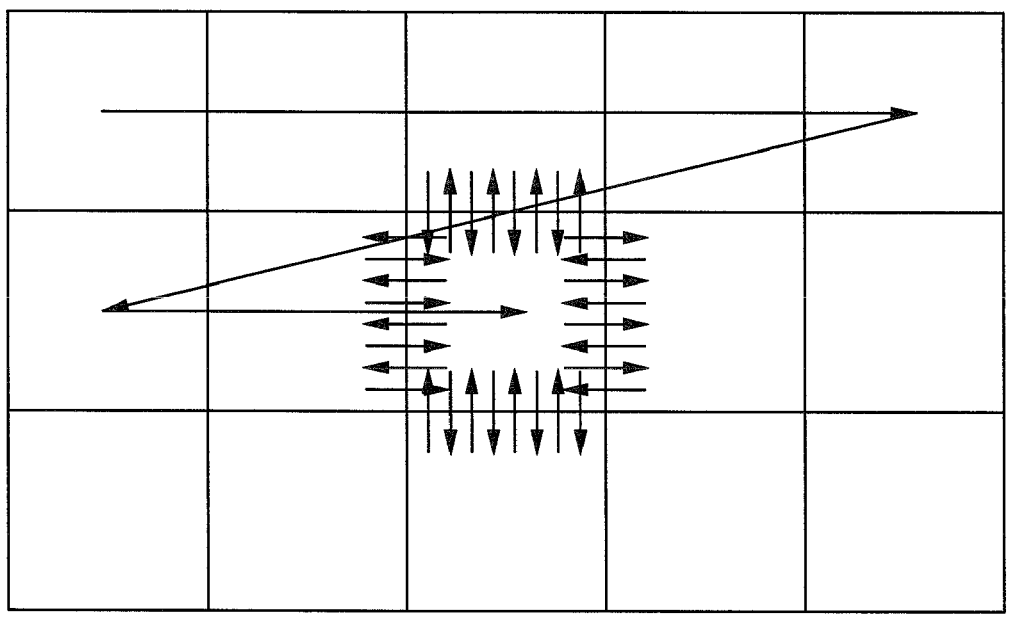
FIG. 3A shows the tiles being processed in a raster scan order.
Figure 3B:
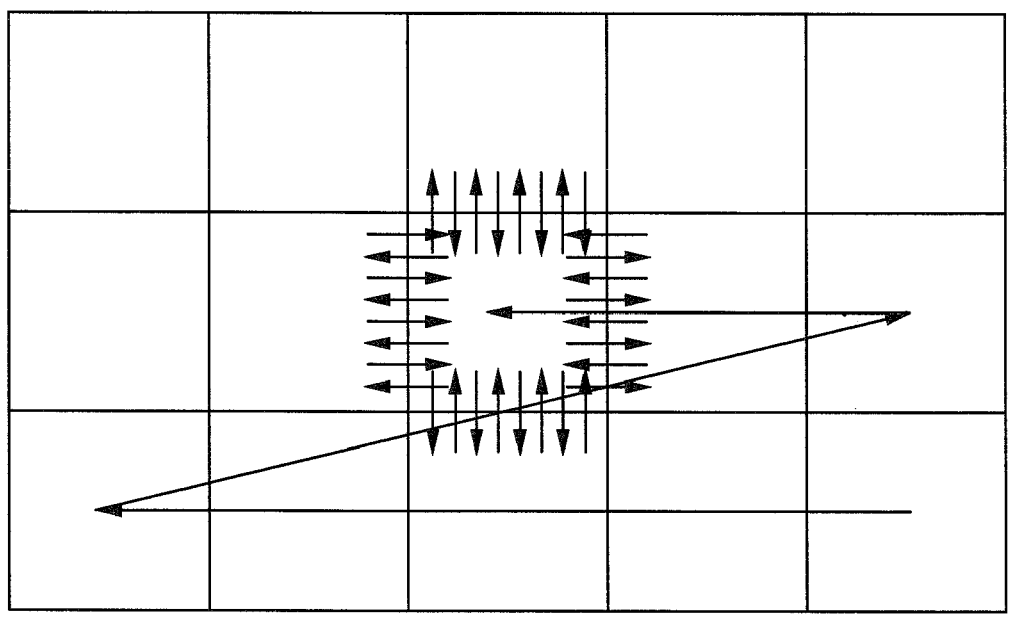
FIG. 3B shows the tiles being processed in an inverse-raster scan order.

The pseudocode has a two-level structure: outer and inner iterations. In the outer iteration, the tiles are first processed in a raster scan order (beginning at line 3 of the pseudocode), and the tiles are then processed in an inverse-raster scan order (beginning at line 9 of the pseudocode). FIG. 3A shows the tiles being processed in the raster scan order (that is, from the top-left tile to the bottom-right tile), and FIG. 3B shows the tiles being processed in the inverse-raster scan order (that is, from the bottom-right tile to the top-left tile). It is appreciated that other scan orders may be adapted. For example, the tiles may be first processed in a vertically downward scan order from the left column to the right column, followed by a vertically upward scan order from the right column to the left column. Moreover, in certain situations, only partial tiles of the image are processed.

For each tile, the messages from other tiles (i.e., the arrows shown in FIG. 2B), the smoothness term $E_s$ and the data term $E_d$ are loaded from the memory, and then a message computing operation is performed within the tile (in step 11) according to the following BP equation (2) (that is, the function BPinOneTile in the pseudocode).

$$M_{pq}^t(l_p) = \min_{l' \in L} \left\{ E_s(l_q, l') + E_d(l') + \sum_{(p,p') \in N_p \setminus q} M_{p'p}^{t-1}(l') \right\} \quad (2)$$

where $N_p$ is the set of the neighbors of p.

Figure 4:
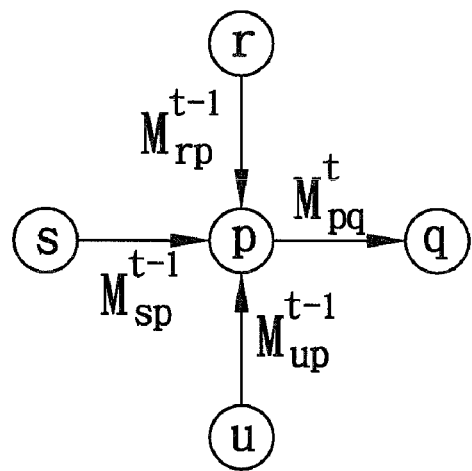
FIG. 4 shows a simplified example in which the message $M_{pq}^t$ at iteration t from p to q is constructed using the messages from neighbors to p at iteration t−1.

Specifically, at iteration t, each node p sends the resultant message $M_{pq}^t$ to its neighbor q. $M_{pq}^t(l)$ encodes the opinion of p about assigning label $l_q$ to q. The message $M_{pq}^t$ at iteration t from p to q is constructed using the messages from neighbors to p at iteration t−1. FIG. 4 shows a simplified example in which the message $M_{pq}^t$ at iteration t from p to q is constructed using the messages ($M_{rp}^{t-1}$, $M_{sp}^{t-1}$ and $M_{up}^{t-1}$) from neighbors (r, s and u) to p at iteration t−1.

Figure 2C:
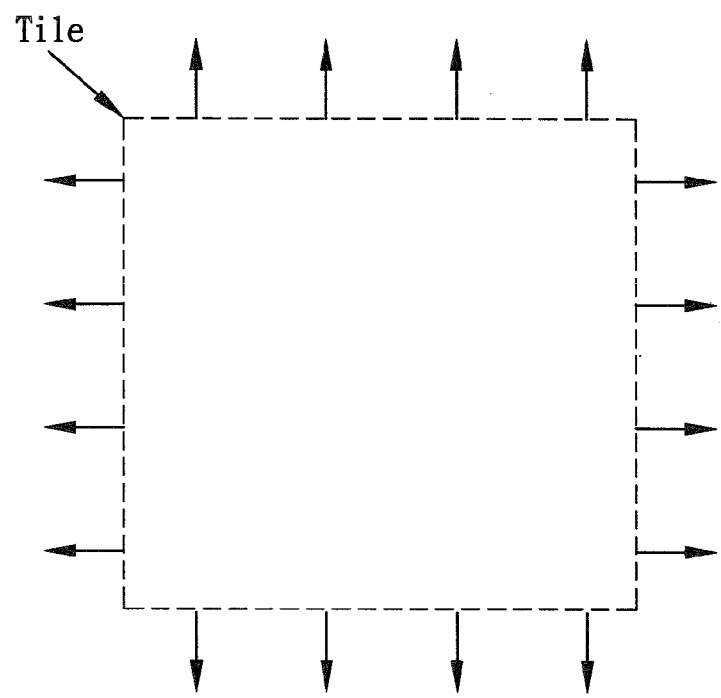
FIG. 2C schematically shows messages $M_{pq}^t$ being sent out of the tile.

After $T_i$ inner iterations (lines 6-7 of the pseudocode), the messages $M_{pq}^t$ for sending out of the tile are stored (in step 12). FIG. 2C schematically shows the messages $M_{pq}^t$ (i.e., arrows) being sent out of the tile. The inner iterations act like a filtering operation that purifies the messages according to the data terms and the smoothness terms within the tile.

As the tiles are processed in the raster/inverse-raster scan order, the messages are thus iteratively propagated. At the $T_0$ outer iteration (that is, the end of the raster scan and the inverse-raster scan), the best labels are determined (in step 13) using the following equation (3) in line 14 of the pseudocode.

$$l_p = \arg\min_{l \in L} \left\{ E_d(l) + \sum_{(p,p') \in N(p)} M_{p'p}^T(l) \right\} \quad (3)$$

where L is the set of all labels.

Figure 5:
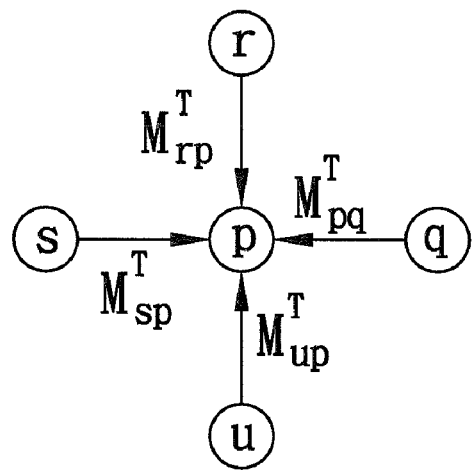
FIG. 5 shows a simplified example in which the node p collects all messages from the neighbors to determine the best label.

After enough iterations, say T (a number), the label of node p is determined based on the local likelihood (i.e., the data term $E_d$) and the messages $M_{p'p}^T$ from the neighbors. FIG. 5 shows a simplified example in which the node p collects all messages from the neighbors (r, s, u and q) to determine the best label.

According to the embodiment, the BP has the following advantages for hardware implementation. First, it is highly parallel. In message passing, each node loads the messages from the previous iteration, operates independently, and generates new messages. Second, it only uses simple operations such as additions and comparisons. Third, the memory access is regular. If the message is updated sequentially, the required input data can be streamed into the processor with ease.

Figure 6:
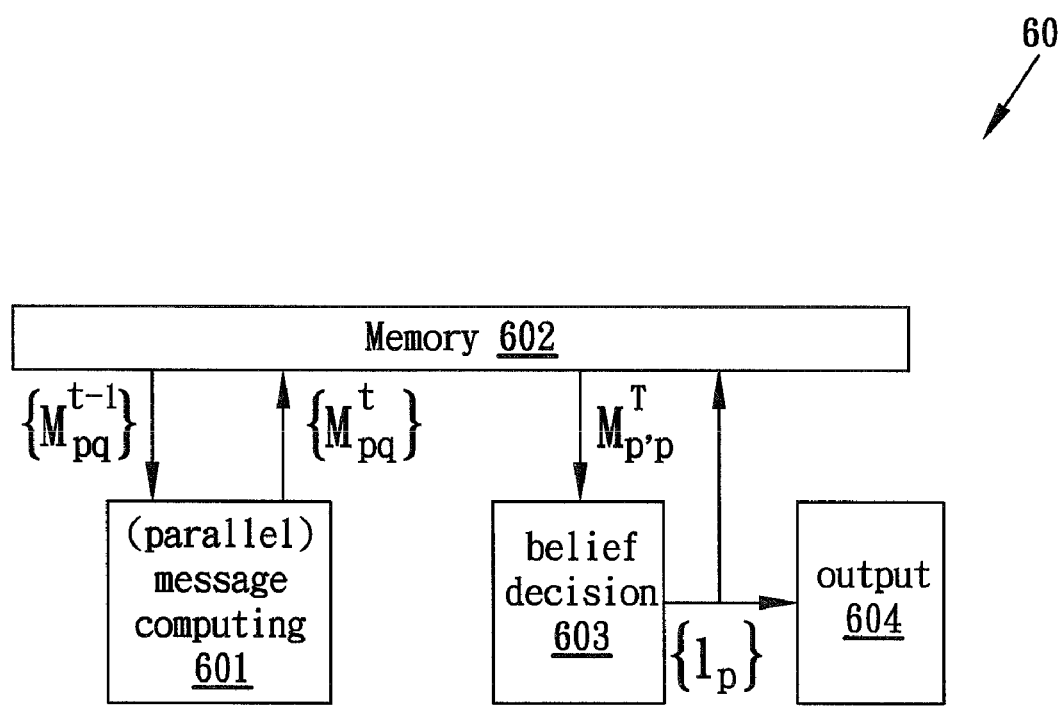
FIG. 6 shows an apparatus of the tile-based belief propagation (BP) according to one embodiment of the present invention.

FIG. 6 shows apparatus 60 of the tile-based belief propagation (BP) according to one embodiment of the present invention. A message computing device 601, preferably a parallel processor, generates message {$M_{pq}^t$} at iteration t according to the messages {$M_{pq}^{t-1}$} from neighbors to p at iteration t−1, which are loaded from an (internal/external) memory 602. According to the tile architecture, the operations of the function BPinOneTile in the pseudocode may be preferably performed in a parallel manner within the parallel processor or the message computing device 601.

After $T_i$ inner iterations (lines 6-7 of the pseudocode), the messages {$M_{pq}^t$} for sending out of the tile are stored in the memory 602. Subsequently, at the $T_0$ outer iteration, a belief decision device 603 determines the best labels {$l_p$} based on the messages $M_{p'p}^T$ from the neighbors. Finally, an output device 604 generates a label map (such as a depth map or a motion vector map) according to the determined labels {$l_p$}.

Table 1 compares the memory and bandwidth consumption of the original belief propagation and the tile-based belief propagation of the present embodiment.

TABLE 1

|  |  | Original BP | Tile-based BP | | | |
|---|---|---|---|---|---|---|
| Tile size ($B^2$) |  |  | $8^2$ | $16^2$ | $32^2$ | $64^2$ |
| Internal memory | Data terms | 16 | 1,024 | 4,096 | 16,384 | 65,536 |
|  | Messages | 64 | 4,096 | 16,384 | 65,536 | 262,144 |
|  | Total | 80 | 5,120 | 20,480 | 81,920 | 327,680 |
|  | Factor (to | 100% | 100% | 100% | 100% |  |

TABLE 1-continued

| | | Original BP | | Tile-based BP | | |
|---|---|---|---|---|---|---|
| External memory | the same tile size) Data terms Messages | 4,915,200 19,660,800 | 2,457,600 | 4,915,200 1,228,800 | 614,400 | 307,200 |
| | Total Factor (to the same tile size) | 24,576,000 100% | 7,372,800 30% | 6,144,000 25% | ,5,529,600 22.5% | 5,222,400 21.25% |
| Bandwidth | Data terms Messages | 19,660,800 78,643,200 | 4,915,200 | 2,457,600 | 1,228,800 | 614,400 |
| | Total Factor (to the same tile size) | 98,304,000 100% | 9,830,400 10% | 7,372,800 7.5% | 6,144,000 6.25% | 5,529,600 5.625% |

Figure 7A:
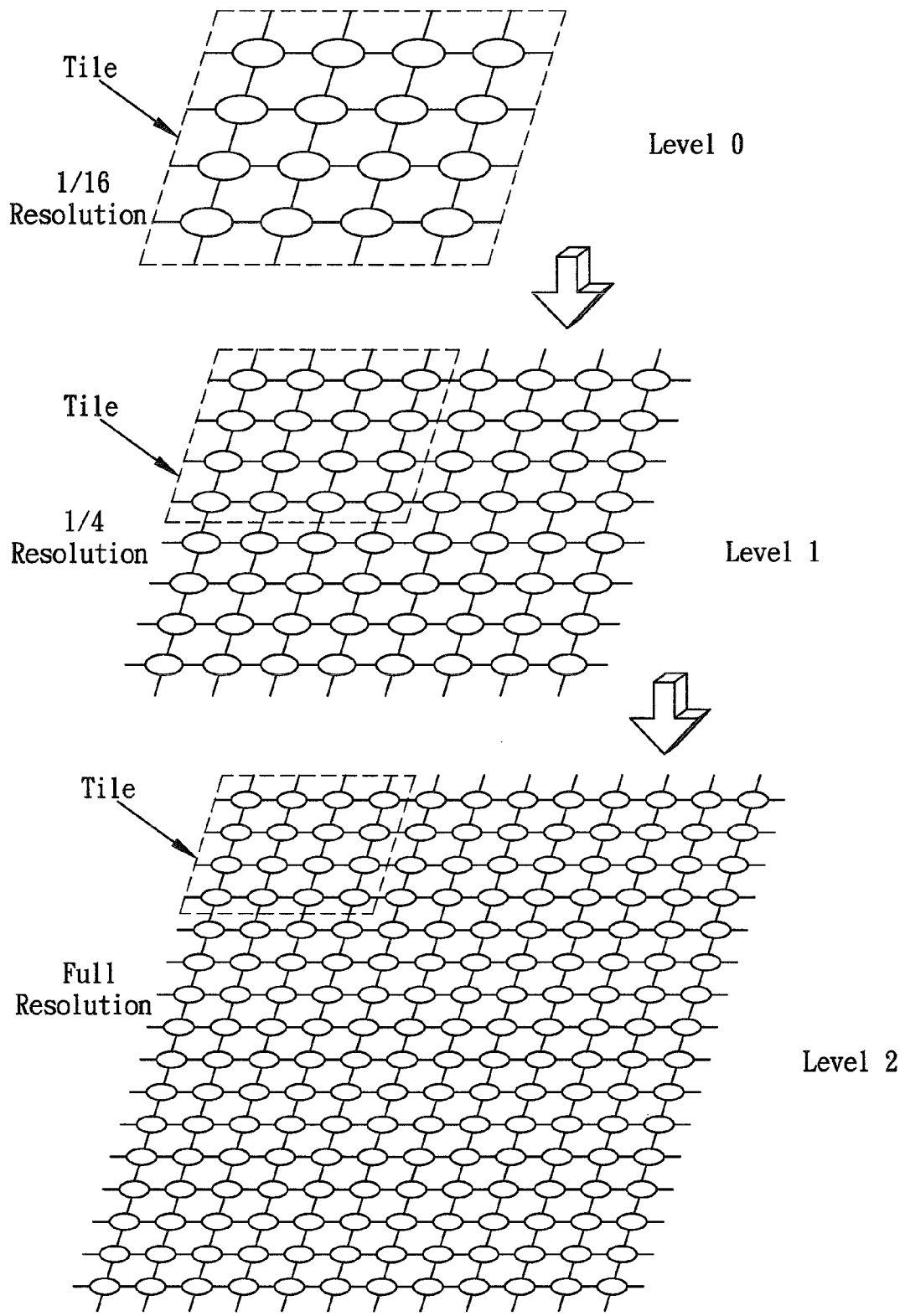
FIG. 7A shows a coarse-to-fine technique for computing the message according to one embodiment of the present invention.
Figure 7B:
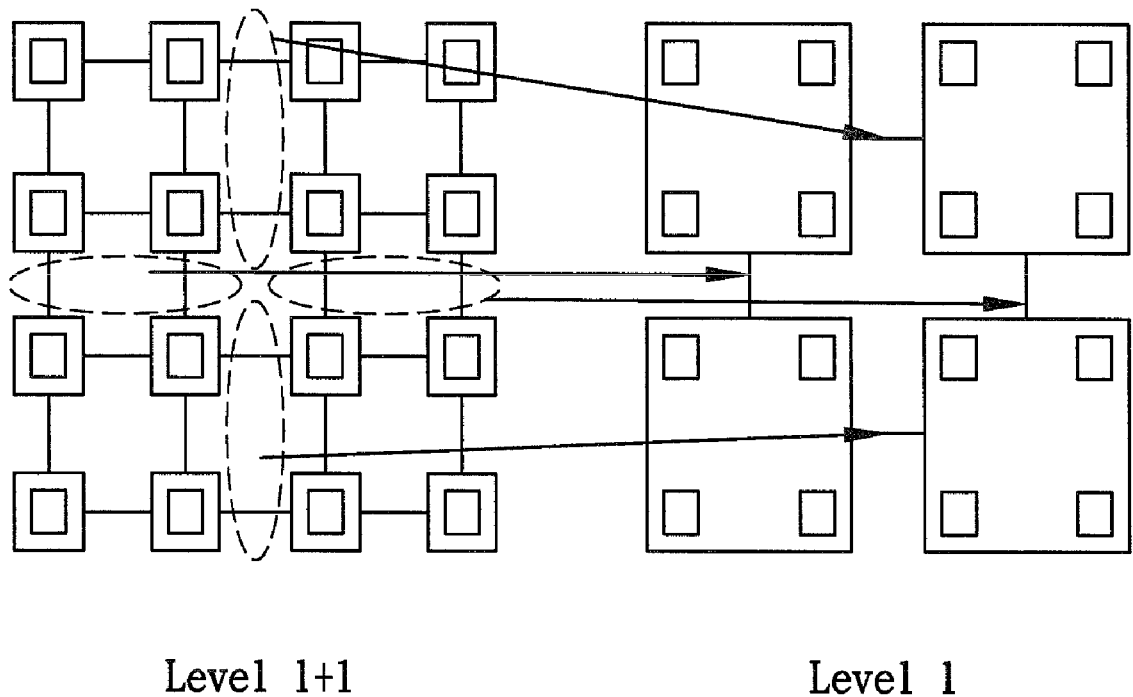
FIG. 7B shows that each node in the level l corresponds to a block of 2×2 nodes in the level l+1.

FIG. 7A shows a coarse-to-fine technique for computing the message according to one embodiment of the present invention. In the embodiment, level 2 has full resolution, level 1 has ¼ resolution, and level 0 has ¹⁄₁₆ resolution. Each node in level 1 corresponds to a block of 2×2 nodes in level 1+1, as shown in FIG. 7B. At the beginning, a coarse computing is performed to run BP on level 0 for the smallest number of iterations. Subsequently, a finer computing is performed on the (level 1) 2×2 nodes corresponding to a single node of level 0. Each message between adjacent nodes on level 0 is duplicated to two messages for the two adjacent pair of nodes on level 1 as shown in FIG. 7B. Finally, a finest computing is performed on the (level 2) 2×2 nodes corresponding to a single node of the level 1.

Although specific embodiments have been illustrated and described, it can be appreciated by those skilled in the art that various modifications may be made without departing from the scope of the present invention, which is intended to be limited solely by the appended claims.

What is claimed is:

1. A method of tile-based belief propagation, comprising:
    splitting an image into a plurality of tiles each including a plurality of pixels;
    iteratively generating messages within each of the tiles based on messages from neighboring pixels to the tile at a previous iteration, wherein each message represents information of a state of the pixel;
    storing generated messages for sending out of the tiles; and
    determining labels based on the stored messages, wherein each label represents the state of the pixel;
    wherein the messages are generated further based on a data energy term $E_d$ and a smoothness energy term $E_s$ in energy minimization on a Markov Random Field (MRF); and
    wherein the step of iteratively generating messages within each of the tiles is performed according to a brief propagation (BP) equation:

$$M_{pq}^t(l_p) = \min_{l' \in L} \left\{ E_s(l_q, l') + E_d(l') + \sum_{(p,p') \in N_p \backslash q} M_{p'p}^{t-1}(l') \right\}$$

in which $N_p$ is a set of neighbors of a pixel p,
$M_{pq}^t$ is the generated message at iteration t, and
$M_{p'p}^{t-1}$ is the message at the previous iteration t−1.

2. The method. of claim 1, further comprising a step of generating a. label map according to the determined labels.

3. The method of claim 1, wherein the iterative steps of generating messages within each of the tiles are performed in a raster scan order.

4. The method. of claim. 3, further performing the iterative steps of generating messages within each of the tiles in an inverse-raster scan order.

5. The method of claim 1, wherein the iterative steps of generating messages within each of the tiles are performed on a portion of the image.

6. The method. of claim. 1, wherein the labels are determined further based on a data energy term $E_d$ in energy minimization on a Markov Random Field (MRF).

7. The method of claim 6, wherein the step of determining labels is performed according to an equation:

$$l_p = \operatorname*{argmin}_{l \in L} \left\{ E_d(l) + \sum_{(p,p') \in N(p)} M_{p'p}^T(l) \right\}$$

where L is a set of all labels l, and
$M_{p'p}^T$ is the message after a specified number of iterations T.

8. The method. of claim 1, wherein, the iterative generating of messages is performed on at least a first level and a second level, wherein each node in the first level corresponds to a block of a plurality of nodes in the second level, wherein each of the nodes includes one or more pixels.

9. The method of claim 8, wherein the iterative generating of messages is performed on the first level, followed by being performed on the second level.

10. The method of claim 9, wherein each message between or among adjacent nodes on the first level is duplicated into a plurality of messages for the adjacent pairs of nodes on the second level.

11. An apparatus of tile-based belief propagation, comprising:
    means for splitting an image into a plurality of tiles each including a plurality of pixels;
    a message computing device for iteratively generating messages within. each of the tiles based on messages from neighboring pixels to the tile at a previous iteration, wherein each message represents information of a state of the pixel;

a memory for storing generated messages for sending out of the tiles; and a belief decision device for determining labels based on the stored messages, wherein each label represents the state of the pixel;

wherein the messages are generated in the message computing device further based on a data energy term $E_d$ and a smoothness energy term $E_s$ in energy minimization on a Markov Random Field (MRF); and wherein the messages are generated in the message computing device according to a brief propagation (BP) equation:

$$M_{pq}^t(l_p) = \min_{l' \in L} \left\{ E_s(l_q, l') + E_d(l') + \sum_{(p,p') \in N_p \setminus q} M_{p'p}^{t-1}(l') \right\}$$

with $N_p$ being a set of neighbors of a pixel p,
$M_{pq}^t$ being the generated message at iteration t, and
$M_{p'p}^{t-1}$, the message at the previous iteration t−1.

12. The apparatus of claim 11, further comprising an output device for generating a label map according to the determined labels.

13. The apparatus of claim 11, wherein the messages are generated in the message computing device in a raster scan order.

14. The apparatus of claim 13, wherein the messages are generated in the message computing device further in an inverse-raster scan order.

15. The apparatus of claim 11, wherein the message computing device is a parallel processor.

16. The apparatus of claim 11, wherein the labels are determined in the belief decision device further based on a data energy term $E_d$ in energy minimization on a Markov Random Field (MRF).

17. The apparatus of claim 16, wherein the labels are determined in the belief decision device according to an equation:

$$l_p = \operatorname*{argmin}_{l \in L} \left\{ E_d(l) + \sum_{(p,p') \in N(p)} M_{p'p}^T(l) \right\}$$

where L is a set of all labels l, and $M_{p'p}^T$ is the message after a specified number of iterations T.

18. The apparatus of claim 11, wherein the generating of messages is performed on at least a first level and a second level, wherein each node in the first level corresponds to a block of a plurality of nodes in the second level, wherein each of the nodes includes one or more pixels.

19. The apparatus of claim 18, wherein the generating of messages is performed on the first level, followed by being performed on the second level.

20. The apparatus of claim 19, wherein each message between or among adjacent nodes on the first level is duplicated into a plurality of messages for the adjacent pairs of nodes on the second level.

21. A method of tile-based belief propagation, comprising:

splitting an image into a plurality of tiles each including a plurality of pixels;

iteratively generating messages within each of the tiles based on messages from neighboring pixels to the tile at a previous iteration, wherein each message represents information of a state of the pixel;

storing generated messages for sending out of the tiles; and determining labels based on the stored messages, wherein each label represents the state of the pixel;

wherein the labels are determined further based on a data energy term $E_d$ in energy minimization on a Markov Random Field (MRF); and wherein the step of determining labels is performed according to an equation:

$$l_p = \operatorname*{argmin}_{l \in L} \left\{ E_d(l) + \sum_{(p,p') \in N(p)} M_{p'p}^T(l) \right\}$$

where L is a set of all labels l, and $M_{p'p}^T$ is the message after a specified number of iterations T.

* * * * *